United States Patent [19]

Shimura et al.

[11] Patent Number: 5,028,781
[45] Date of Patent: Jul. 2, 1991

[54] DENSITY CORRECTING METHOD AND APPARATUS FOR SUBTRACTION IMAGE

[75] Inventors: Kazuo Shimura; Nobuyoshi Nakajima; Masamitsu Ishida, all of Kanagawa, Japan

[73] Assignee: Fuji Photo Film Co., Ltd., Kanagawa, Japan

[21] Appl. No.: 116,196

[22] Filed: Nov. 3, 1987

Related U.S. Application Data

[63] Continuation of Ser. No. 726,273, Apr. 23, 1985.

[30] Foreign Application Priority Data

Apr. 23, 1984 [JP] Japan .................................. 59-81541
May 28, 1984 [JP] Japan ................................. 59-107911
May 28, 1984 [JP] Japan ................................. 59-107912

[51] Int. Cl.$^5$ ......................................... G01N 23/04
[52] U.S. Cl. ............................. 250/327.2; 250/484.1
[58] Field of Search ...................... 250/484.1, 327.2; 364/414; 358/284

[56] References Cited

U.S. PATENT DOCUMENTS

| 4,258,264 | 3/1981 | Kotera et al. | 250/484 |
| 4,302,672 | 11/1981 | Kato et al. | 250/327.2 |
| 4,346,406 | 8/1982 | Kato et al. | 358/110 |
| 4,368,384 | 1/1983 | Kato et al. | 250/354.1 |
| 4,564,861 | 1/1986 | Hishinuma et al. | 358/111 |

Primary Examiner—Jack I. Berman
Assistant Examiner—Richard Hanig
Attorney, Agent, or Firm—Sughrue, Mion, Zinn, Macpeak & Seas

[57] ABSTRACT

In an energy subtraction processing for radiation images conducted by use of stimulable phosphor sheets, a characteristic value of a difference signal obtained by a subtraction processing of digital image signals detected from the stimulable phosphor sheets carrying radiation images stored therein is calculated. When the difference signal is subjected to a gradation processing, the characteristic value is made to correspond to a predetermined density of a reproduced image by uniformly converting the difference signal or by correcting a gradation conversion table used for the gradation processing.

27 Claims, 7 Drawing Sheets

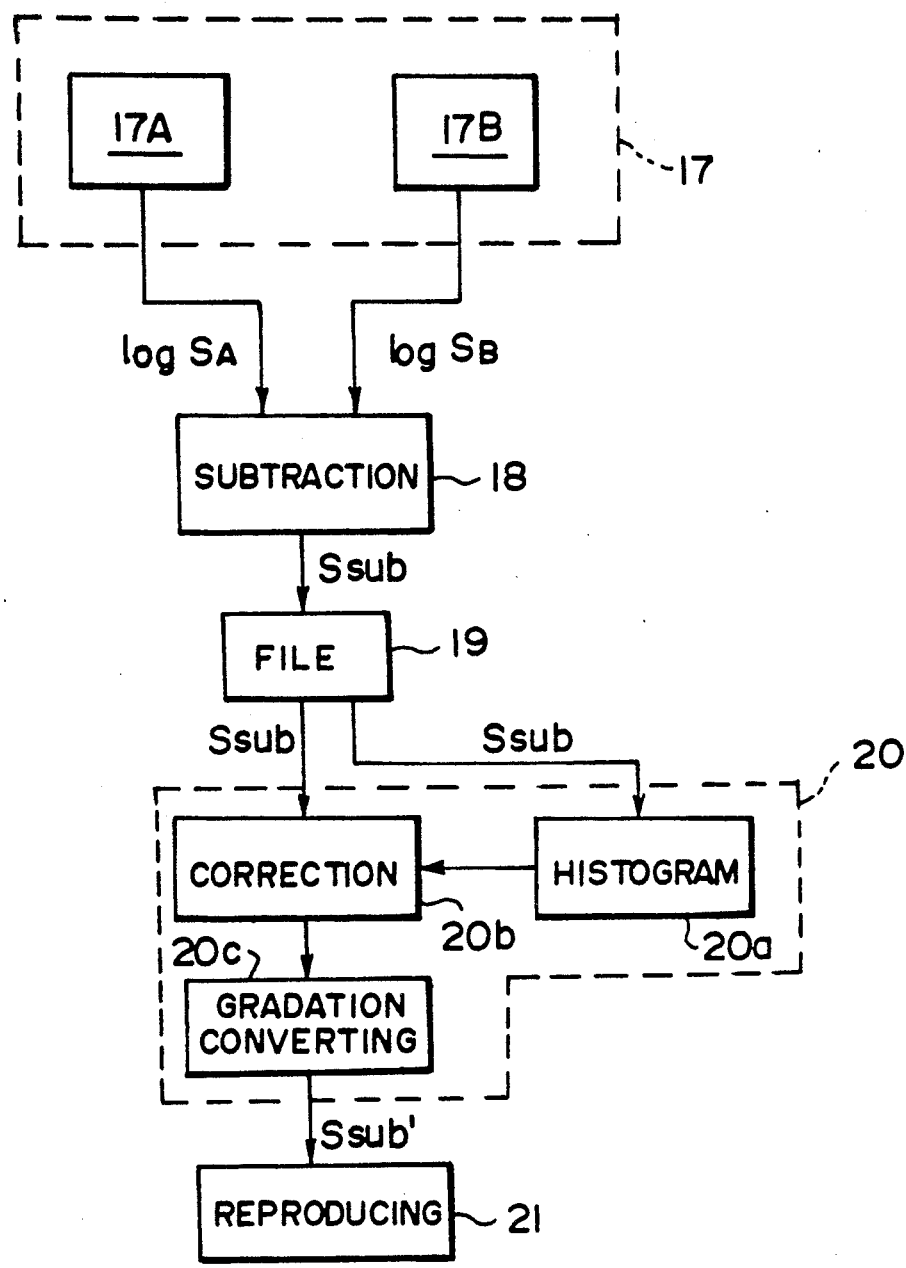
F I G.3

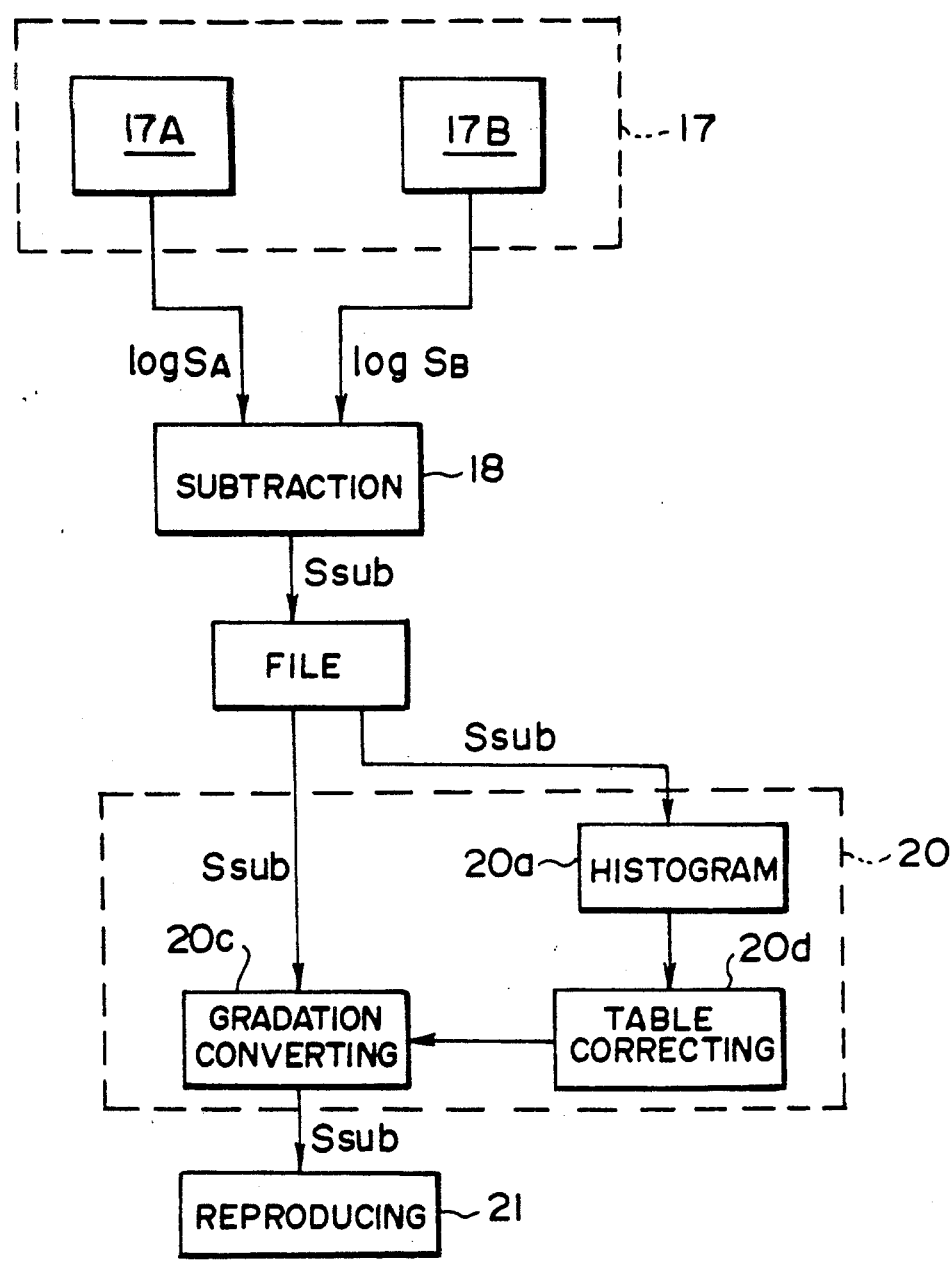

DENSITY CORRECTING METHOD AND APPARATUS FOR SUBTRACTION IMAGE

This is a continuation, of application Ser. No. 726,273, filed 4-23-85.

BACKGROUND OF THE INVENTION

1. Field of the Invention

This invention relates to a method of correcting the density of a subtraction image obtained by a subtraction processing of radiation images, and an apparatus for carrying out the method. This invention particularly relates to a method of correcting the density of a subtraction image obtained by a digital subtraction processing of radiation images conducted by use of stimulable phosphor sheets so that the density range of the subtraction image becomes always the same, and an apparatus for carrying out the method.

2. Description of the Prior Art

Conventionally, a digital subtraction processing method is used for processing radiation images. In the method, two radiation images recorded under conditions different from each other are photoelectrically read out to obtain digital image signals, which are then subjected to a subtraction processing with respect to the corresponding picture elements of the images, thereby to obtain a difference signal for forming an image of a specific structure contained in the radiation images. The method makes it possible to reproduce a radiation image of only the specific structure by use of the signal thus obtained.

Basically, subtraction processing is classified into the so-called temporal (time difference) subtraction processing method and the so-called energy subtraction processing method. In the former method, the image of a specific structure is extracted by subtracting the image signal of a radiation image obtained without injection of contrast media from the image signal of a radiation image in which the image of the specific structure is enhanced by the injection of contrast media. In the latter method, an object is exposed to radiations having energy distributions different from each other to obtain two radiation images respectively containing the images of a specific structure recorded on the basis of the intrinsic radiation energy absorption characteristics of the specific structure. Then, the image signals of the two radiation images are weighted appropriately when necessary, and subjected to subtraction to extract the image of the specific structure.

Since subtraction processing is extremely effective for diagnostic purposes in image processings for medical X-ray photographs, it has recently attracted much attention, and research has continued to develop improved methods by use of electronic technology. The processing technique is specifically called the digital subtraction processing method, or more commonly, digital radiography (abbreviated as "DR").

A novel digital subtraction processing method has been proposed, for example, in Japanese Unexamined Patent Publication No. 58(1983)-163340. The method comprises the steps of (i) using two or more stimulable phosphor sheets exhibiting an extremely wide latitude of exposure to a radiation, (ii) exposing the stimulable phosphor sheets to the radiation passing through the same object under different conditions to have radiation images of the object stored in the stimulable phosphor sheets, image information on the specific structure being different between the radiation images, (iii) detecting the radiation images by scanning with stimulating rays to obtain digital image signals, and (iv) conducting a digital subtraction processing by use of the digital image signals. The stimulable phosphor sheets comprise a stimulable phosphor which is able to store a part of the radiation energy when exposed to a radiation such as X-rays, α-rays, β-rays, γ-rays, cathode rays or ultraviolet rays, and then emits light in proportion to the stored energy of the radiation when exposed to stimulating rays such as visible light, as disclosed for example in U.S. Pat. No. 4,258,264. The stimulable phosphor sheets exhibit an extremely wide latitude of exposure and a markedly high resolving power. Therefore, when the digital subtraction processing is conducted by use of the radiation images stored in the stimulable phosphor sheets, it is possible to obtain a radiation image having an improved image quality, particularly a high diagnostic efficiency and accuracy, regardless of the amount of radiation to which the stimulable phosphor sheets are exposed.

The stimulable phosphor sheets can also be used for the aforesaid energy subtraction processing. However, when difference signals obtained by the subtraction processing are directly used for reproducing images, the density range (or luminance range when the images are reproduced on a cathode ray tube) becomes different among the reproduced images. This is because image signals detected from two or more radiation images for the subtraction processing are caused to fluctuate by any fluctuation in sensitivity of the stimulable phosphor sheets, fluctuation in sensitivity of the image readout apparatus, fluctuation in radiation exposure dose at the radiation image recording step, or the like. The difference signal obtained by the subtraction processing is very weak. Therefore, when the image signals fluctuate as described above, the level of the fluctuation component in the difference signal obtained from the image signals becomes markedly higher than the level of the correct signal component, and the density range of the subtraction image reproduced by use of the difference signal fluctuates largely. As a result, the subtraction image often becomes unsuitable for viewing, particularly for diagnostic purposes, so that it is not always possible to carry out correct diagnosis, for example, by comparing many subtraction images.

In order to obtain radiation images for the energy subtraction processing conducted by use of the stimulable phosphor sheets, i.e. radiation images wherein the image information on a specific structure is different, radiation energy to which the stimulable phosphor sheets are exposed may be changed by changing the tube voltage of the radiation source. Alternatively, a filter for changing the energy distribution of the radiation may be inserted between the radiation source and the object, or any other known method may be used. Also, the radiation images may be recorded by a single radiation exposure operation by use of a stimulable phosphor sheet-filter stack or the like as described in Japanese Patent Application No. 57(1982)-193765. This application has a U.S. equivalent, application Ser. No. 883,429, filed July 15, 1986 and commonly assigned with the present application. Ser. No. 883,429 is a continuation of Ser. No. 548,486, filed Nov. 3, 1983, now abandoned.

SUMMARY OF THE INVENTION

The primary object of the present invention is to provide a method of correcting the density of an energy subtraction image so that energy subtraction images having the same density range and an improved image quality, particularly a high diagnostic efficiency and accuracy, are obtained.

Another object of the present invention is to provide a method of correcting the density of an energy subtraction image so that energy subtraction images having the same density range, the same contrast, and an improved image quality, particularly a high diagnostic efficiency and accuracy, are obtained.

The specific object of the present invention is to provide an apparatus for carrying out the method.

The present invention provides a method of correcting the density of a subtraction image in a gradation processing in an energy subtraction processing which includes the steps of exposing two or more stimulable phosphor sheets to radiations having different levels of energy passing through the same object to have radiation images of said object stored in said stimulable phosphor sheets, at least a part of the image information being different between said radiation images, scanning the respective stimulable phosphor sheets by stimulating rays to sequentially release the radiation energy stored in said stimulable phosphor sheets as light emission, photoelectrically detecting and converting the amounts of the emitted light into digital image signals, obtaining a difference signal for forming an image of a specific structure of said object by carrying out a subtraction processing of said digital image signals between corresponding picture elements of said radiation images, and then subjecting said difference signal to a gradation processing, the method of correcting the density of a subtraction image comprising the steps of: calculating a characteristic value in said difference signal, and making said characteristic value correspond to a predetermined density of a reproduced image.

The characteristic value may be a mean value between the maximum value and the minimum value of the difference signal, the maximum frequency point signal calculated from a histogram of the difference signal (in many cases, the maximum frequency point signal represents the density of a predetermined image portion such as the background), or a mean value calculated from the histogram of the difference signal.

As the characteristic value, it is also possible to use at least two different signal values calculated from the histogram of the difference signal, or to use the maximum signal value and the minimum signal value of the difference signal which may be calculated from the histogram of the difference signal or may be calculated by sequentially comparing the values of the difference signal. The method wherein the maximum signal value and the minimum signal value of the difference signal are calculated by sequentially comparing the values of the difference signal is advantageous over the method wherein they are calculated from the histogram in that the method can be achieved simply only with hardware and the operation speed is high.

In order to make the characteristic value correspond to the predetermined density of the reproduced image, the difference signal may be uniformly converted prior to the gradation processing, or the gradation conversion table may be corrected.

The apparatus for carrying out the method of correcting the density of a subtraction image in accordance with the present invention wherein the difference signal is uniformly converted prior to the gradation processing comprises:

(i) an image read-out means for scanning stimulable phosphor sheets carrying radiation images stored therein by stimulating rays which cause said stimulable phosphor sheets to emit light in proportion to the stored radiation energy, and photoelectrically detecting and converting the emitted light into digital image signals, (ii) a subtraction operation means for obtaining a difference signal for forming an image of a specific structure by conducting a subtraction processing of said digital image signals between the corresponding picture elements of said radiation images, said digital image signals being detected by said image read-out means from two or more stimulable phosphor sheets carrying said radiation images stored therein by exposure to radiations having different levels of energy passing through the same object, at least a part of the image information being different between said radiation images, (iii) an image processing means for conducting a gradation processing on said difference signal on the basis of a gradation conversion table, (iv) an operation means for calculating a predetermined characteristic value of said difference signal, and (v) a signal correcting circuit for making said characteristic value of said difference signal correspond to a predetermined density of a reproduced image by uniformly converting said difference signal prior to said gradation processing.

The apparatus for carrying out the method of correcting the density of a subtraction image in accordance with the present invention wherein the gradation conversion table is corrected comprises, instead of the signal correcting circuit in the aforesaid apparatus, a gradation conversion table correcting circuit for correcting the gradation conversion table so that the characteristic value of the difference signal corresponds to the predetermined density of the reproduced image.

In the present invention, the general density or both the general density and the general contrast of energy subtraction images can be maintained the same among the different subtraction images. Therefore, it is possible to obtain subtraction images having markedly improved image quality, particularly a high diagnostic efficiency and accuracy. Further, since the density or both the density and the contrast are maintained within predetermined ranges, it becomes possible to very efficiently utilize the dynamic range of the recording medium on which the subtraction image is reproduced. Also, since the method of the present invention can be carried out automatically by use of electric circuits, the method is advantageous particularly when the subtraction operation processing is conducted continuously and the subtraction images are observed in real time mode by use of a cathode ray tube.

BRIEF DESCRIPTION OF THE DRAWINGS

FIG. 3 is a block diagram showing an energy subtraction processing wherein an embodiment of the method of correcting the density of a subtraction image in accordance with the present invention is employed, FIG. 6 is a block diagram showing an energy subtraction processing wherein another embodiment of the method in accordance with the present invention is employed.

DESCRIPTION OF THE PREFERRED EMBODIMENTS

The present invention will hereinbelow be described in further detail with reference to the accompanying drawings.

Figure 1:
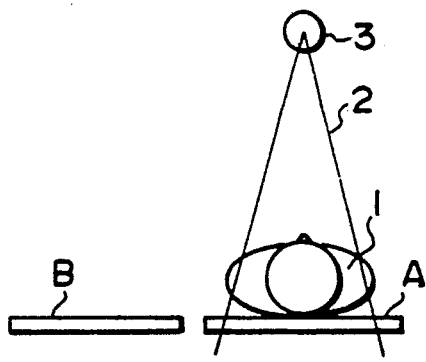
FIG. 1 is an explanatory view showing the radiation image recording step in the method of correcting the density of a subtraction image in accordance with the present invention.

FIG. 1 shows the step of exposing stimulable phosphor sheets A and B respectively to X-rays 2 of different levels of energy passing through the same object 1. First, the stimulable phosphor sheet A is exposed to X-rays 2 passing through the object 1 to have an X-ray image of the object 1 stored therein. Then, the stimulable phosphor sheet A is quickly removed from the image recording position, and the stimulable phosphor sheet B is quickly moved to the image recording position. At the same time, the tube voltage of an X-ray source 3 is changed, and an X-ray image of the object 1 is stored in the stimulable phosphor sheet B by the X-rays 2 having a different energy level. At this time, the relationship between the positions of the stimulable phosphor sheet A and the object 1 and the relationship between the stimulable phosphor sheet B and the object 1 are maintained the same.

Figure 2:
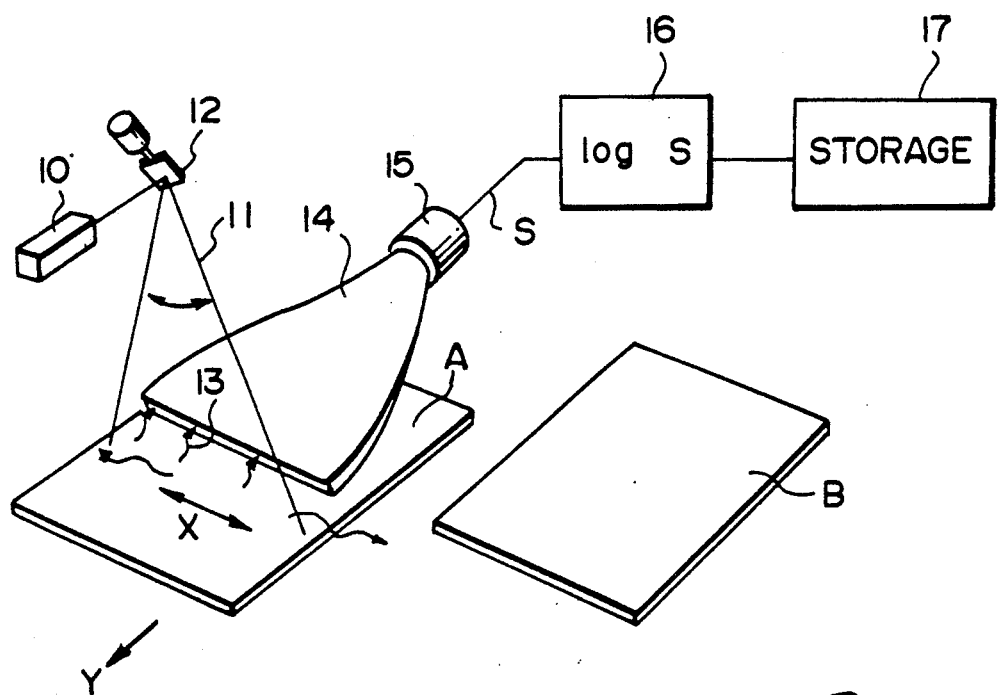
FIG. 2 is a schematic view showing the step of reading out the radiation images from the stimulable phosphor sheets carrying the radiation images stored therein as shown in FIG. 1.

As described above, two radiation images differing from each other in at least a part of their image information are stored in the stimulable phosphor sheets A and B. From the stimulable phosphor sheets A and B carrying the X-ray images stored therein, the X-ray images are read out by use of the image read-out means as shown in FIG. 2 to obtain digital image signals representing the X-ray images. First, while the stimulable phosphor sheet A is moved in the direction as indicated by the arrow Y to conduct sub-scanning, a laser beam 11 emitted by a laser beam source 10 is deflected in the direction as indicated by the arrow X by a scanning mirror 12 to conduct main scanning. In this manner, the stimulable phosphor sheet A is caused to release the X-ray energy stored therein as light 13 in proportion to the X-ray energy. The emitted light 13 enters a light guide member 14, which is made by forming a transparent acrylic sheet, from one end face thereof. The light guide member 14 may be of a shape and a material as disclosed in U.S. Pat. No. 4,346,295. The light 13 is then guided through total reflection inside of the light guide member 14 up to a photomultiplier 15, and the amount of the light 13 is output as an image signal S by the photomultiplier 15. The image signal S is then converted into a digital image signal logSA of a logarithmic value (logS) by a log-converter 16 comprising an amplifier and an A/D converter. The digital image signal logSA is stored in a storage medium 17 such as a magnetic tape. Thereafter, the X-ray image stored in the other stimulable phosphor sheet B is read out therefrom in exactly the same manner as described above, and digital image signal logSB thus obtained is stored in the storage medium 17.

Thereafter, a subtraction processing is conducted by use of the digital image signals logSA and logSB obtained as described above. FIG. 3 shows the flow of the subtraction processing wherein an embodiment of the method of correcting the density of a subtraction image in accordance with the present invention is employed. First, the digital image signals logSA and logSB are read respectively from image files 17A and 17B in the storage medium 17, and are sent to a subtraction operation circuit 18. The subtraction operation circuit 18 weights the digital image signals logSA and logSB obtained as described above by use of weight factors a and b, and conducts a subtraction processing between the digital image signals logSA and logSB with respect to the corresponding picture elements to obtain a digital difference signal Ssub as expressed by $$Ssub = a \cdot logSA - b \cdot logSB + C$$

where a, b and c are constants. The constant c is a bias component for adjusting the density of the difference signal Ssub approximately to a predetermined value. The difference signal Ssub is stored in an image file 19 and is then sent to an image processing circuit 20 in which a gradation processing is carried out on the basis of a gradation conversion table 20c via a histogram operation circuit 20a and a signal correcting circuit 20b as described later.

Figure 4:
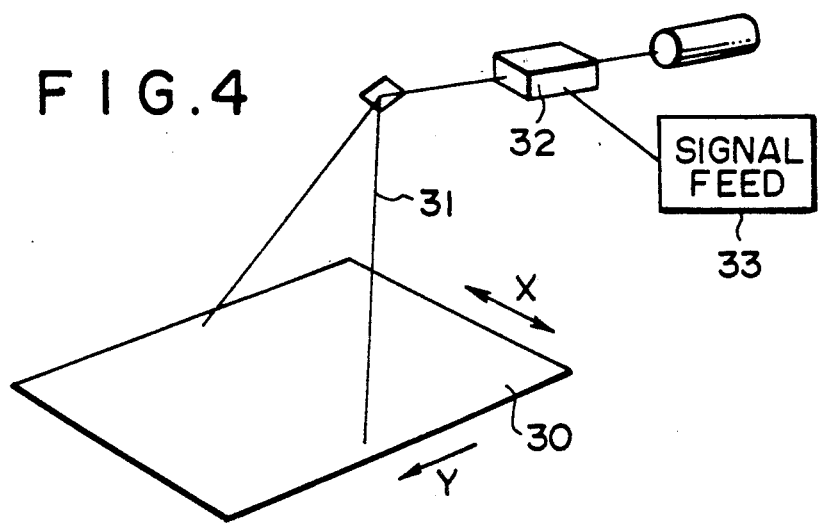
FIG. 4 is a schematic view showing an example of the subtraction image reproducing system.

A difference signal Ssub' obtained by the gradation processing is sent to an image reproducing apparatus 21, for example, a display device such as a cathode ray tube or a point-by-point scanning apparatus which reproduces a subtraction image by use of the difference signal Ssub'. FIG. 4 shows an apparatus for reproducing the image by point-by-point scanning as an example of the subtraction image reproducing system. A photosensitive film 30 is moved in the sub-scanning direction as indicated by the arrow Y, and at the same time a laser beam 31 is deflected onto the photosensitive film 30 in the main scanning direction as indicated by the arrow X. The laser beam 31 is modulated by an A/O modulator 32 with an image signal sent from an image signal feeder 33, thereby to form a visible image on the photosensitive film 30. By using the difference signal Ssub' as the modulating image signal, it is possible to reproduce a visible image wherein only a desired specific structure is extracted by the digital subtraction processing on the photosensitive film 30.

Figure 5:
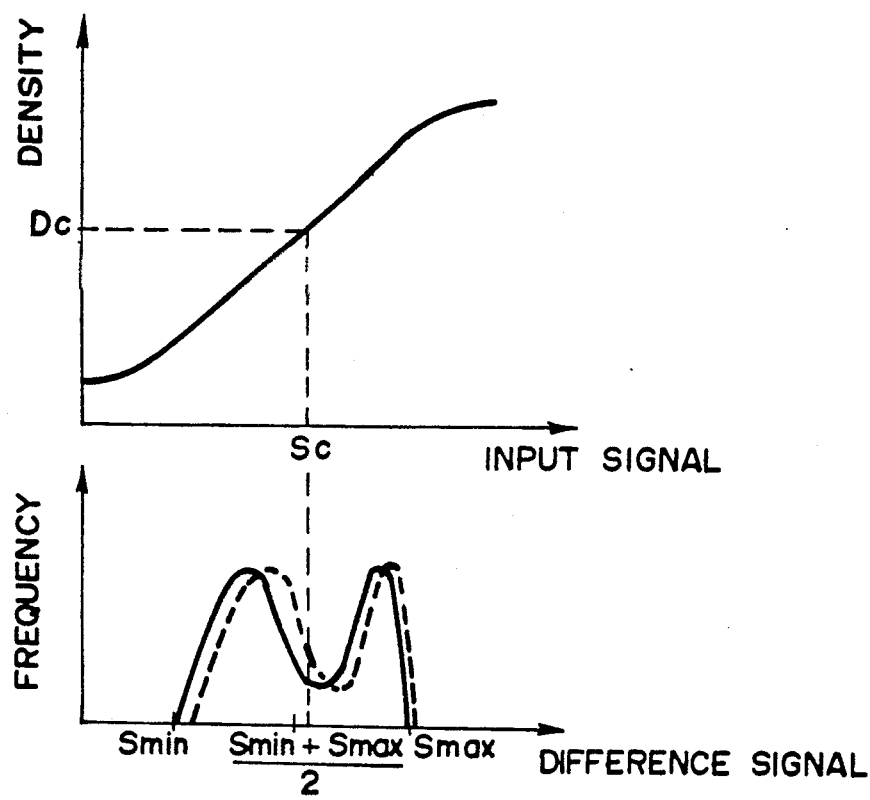
FIG. 5 is an explanatory view showing density correction in the embodiment of FIG. 3.

The density range of the energy subtraction image reproduced on the photosensitive film 30 is not always the same due to fluctuation in sensitivity of the stimulable phosphor sheets A and B and fluctuation in X-ray dose at the image recording step. Therefore, as shown in FIG. 3, the difference signal Ssub is sent to a histogram operation circuit 20a for obtaining a histogram of the difference signal Ssub. As shown in FIG. 5, the histogram operation circuit 20a calculates the mean value (Smax+Smin)/2 between the maximum value Smax and the minimum value Smin of the histogram. Then, the difference signal Ssub is uniformly converted by a signal correcting circuit 20b so that the mean value corresponds to a predetermined value Sc as indicated by the broken line in FIG. 5. Accordingly, the subtraction image portion represented by the mean value always has a predetermined density Dc corresponding to the predetermined value Sc, and the general density of the subtraction images becomes always the same.

Figure 7:
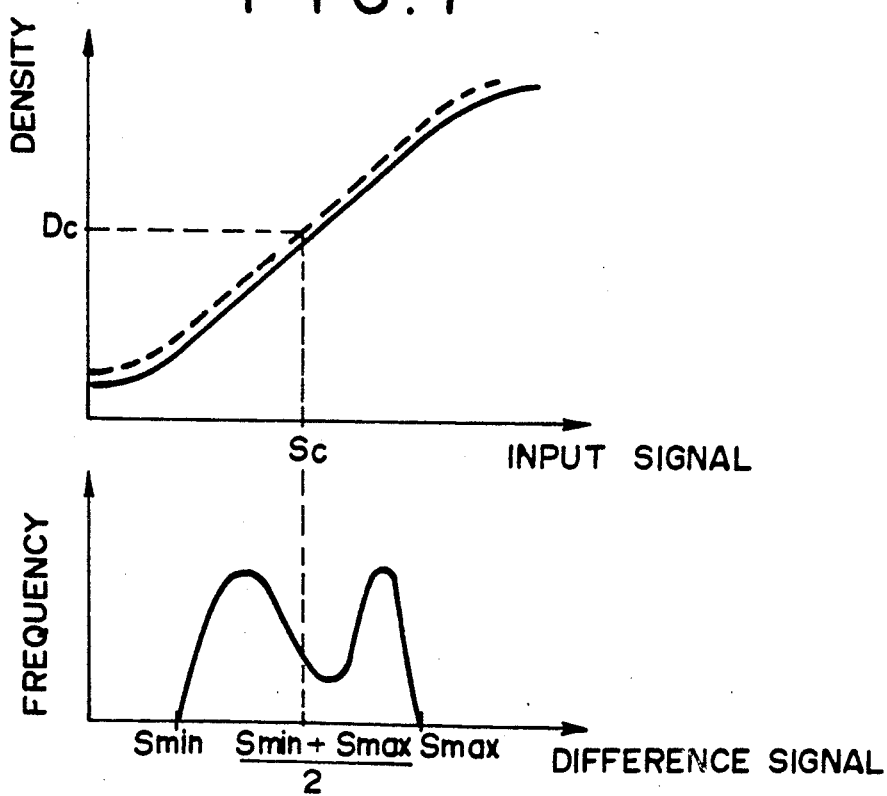
FIG. 7 is an explanatory view showing density correction in the embodiment of FIG. 6.

FIG. 6 shows the flow of the subtraction processing in which another embodiment of the method in accordance with the present invention is employed. In this embodiment, the mean value calculated as described above is sent from the histogram operation circuit 20a to a gradation conversion table correcting circuit 20d which corrects (i.e. shifts) the gradation conversion table 20c as shown in FIG. 7 so that the mean value corresponds to a predetermined value Sc. Accordingly, the subtraction image portion represented by the mean value always has a predetermined density Dc corresponding to the predetermined value Sc, and the general density of the subtraction images becomes always the same.

As the characteristic value of the difference signal Ssub, it is possible to use any other value representing the characteristics of the difference signal, such as the maximum frequency point value or the average value of the difference signal histogram. Further, the characteristic value may be calculated from the whole difference signal or only from the difference signal of a pertinent region of the energy subtraction image where the density range should be maintained the same among the subtraction images. In the latter case, it is possible to select a plurality of pertinent regions, and to calculate the characteristic value from the difference signal at all of the pertinent regions or to calculate partial characteristic values of the respective pertinent regions and calculate a predetermined characteristic value, for example, the maximum value, the minimum value, the average value or the like, from the partial characteristic values.

Figure 8:
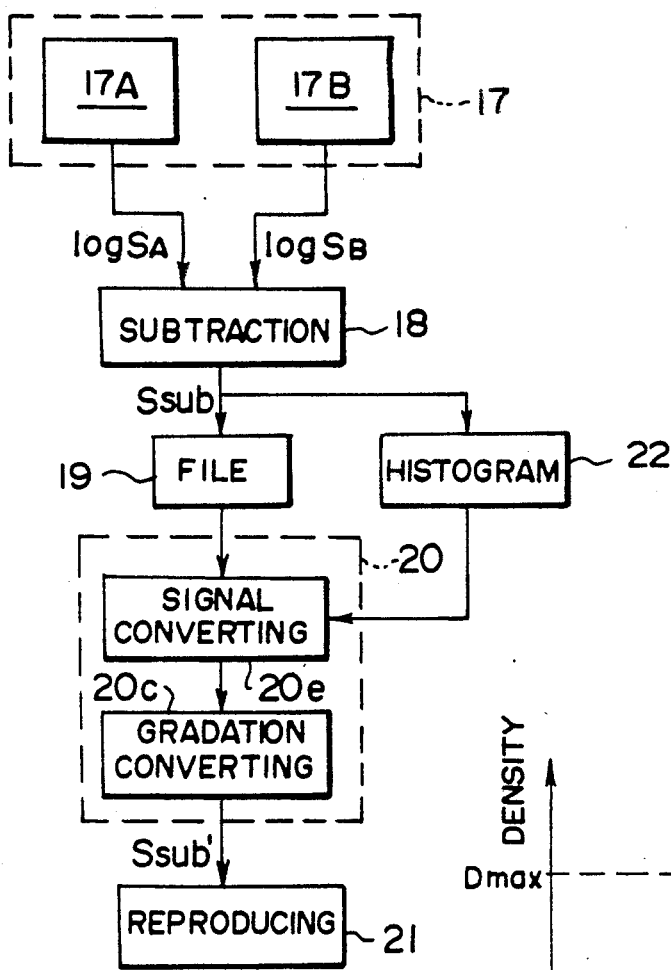
FIG. 8 is a block diagram showing an energy subtraction processing wherein a gradation processing is conducted by use of a further embodiment of the method in accordance with the present invention.
Figure 9:
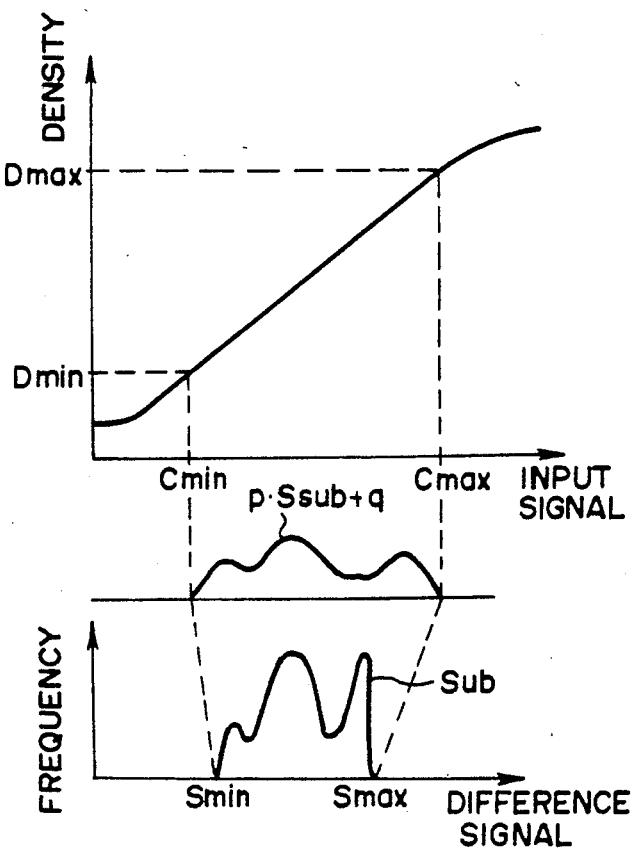
FIG. 9 is an explanatory view showing the gradation processing in the embodiment of FIG. 8.

FIG. 8 shows the flow of a subtraction processing in which a further embodiment of the method in accordance with the present invention is employed. In this embodiment, the difference signal Ssub obtained in the same manner as described with reference to FIG. 3 is sent to a histogram operation circuit 22 for obtaining a histogram of the difference signal Ssub. As shown in FIG. 9, the histogram operation circuit 22 calculates, for example, the maximum value Smax and the minimum value Smin of the difference signal Ssub from the histogram, and sends signals representing the maximum value Smax and the minimum value Smin to a signal converting circuit 20e of an image processing circuit 20. The signal converting circuit 20e converts the difference signal Ssub as expressed, for example, by $$Ssub \rightarrow p \cdot Ssub + q$$

$$p = (Cmax - Cmin)/(Smax - Smin)$$

$$q = (Cmax + Cmin)/2 - (Smax + Smin)/2$$

so that the maximum value Smax and the minimum value Smin correspond respectively to predetermined values Cmax and Cmin.

The signal $p \cdot Ssub + q$ obtained by the signal conversion is subjected to a gradation processing based on a gradation conversion table 20c in the image processing circuit 20. As shown in FIG. 9, the predetermined values Cmax and Cmin correspond respectively to the maximum density value Dmax and the minimum density value Dmin of the subtraction image. Therefore, the subtraction image formed by the converted signal $p \cdot Ssub + q$ always has a predetermined density range and contrast.

Figure 10:
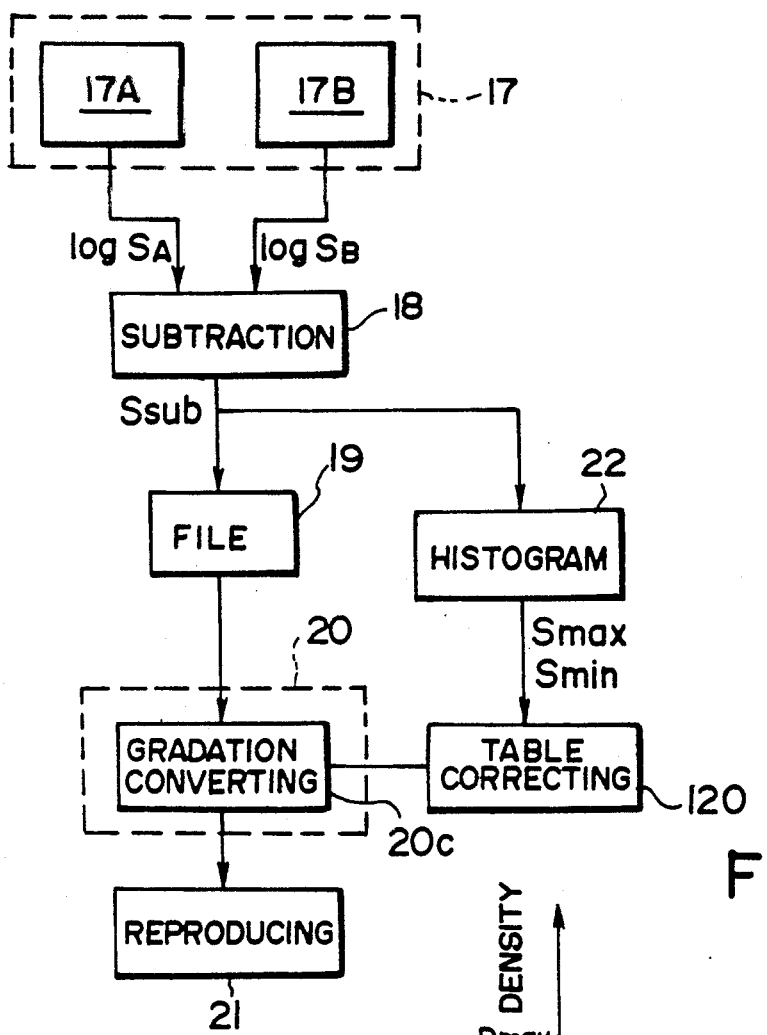
FIG. 10 is a block diagram showing an energy subtraction processing wherein a gradation processing is conducted by use of a still further embodiment of the method in accordance with the present invention.
Figure 11:
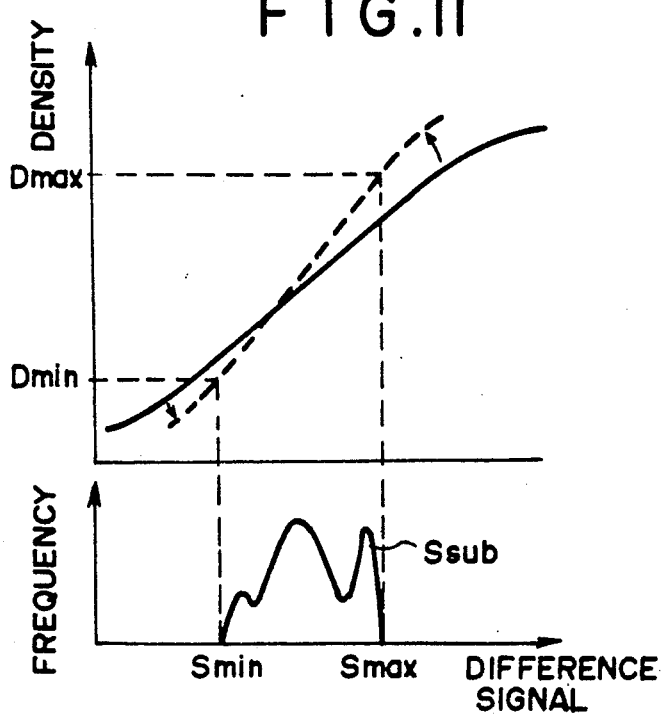
FIG. 11 is an explanatory view showing the gradation processing in the embodiment of FIG. 10.

The same effects are obtained also by, instead of converting the difference signal Ssub by the signal converting circuit 20e, correcting the gradation conversion table 20c as shown in FIG. 11 by use of a gradation conversion table correcting circuit 120 as shown in FIG. 10.

Figure 12:
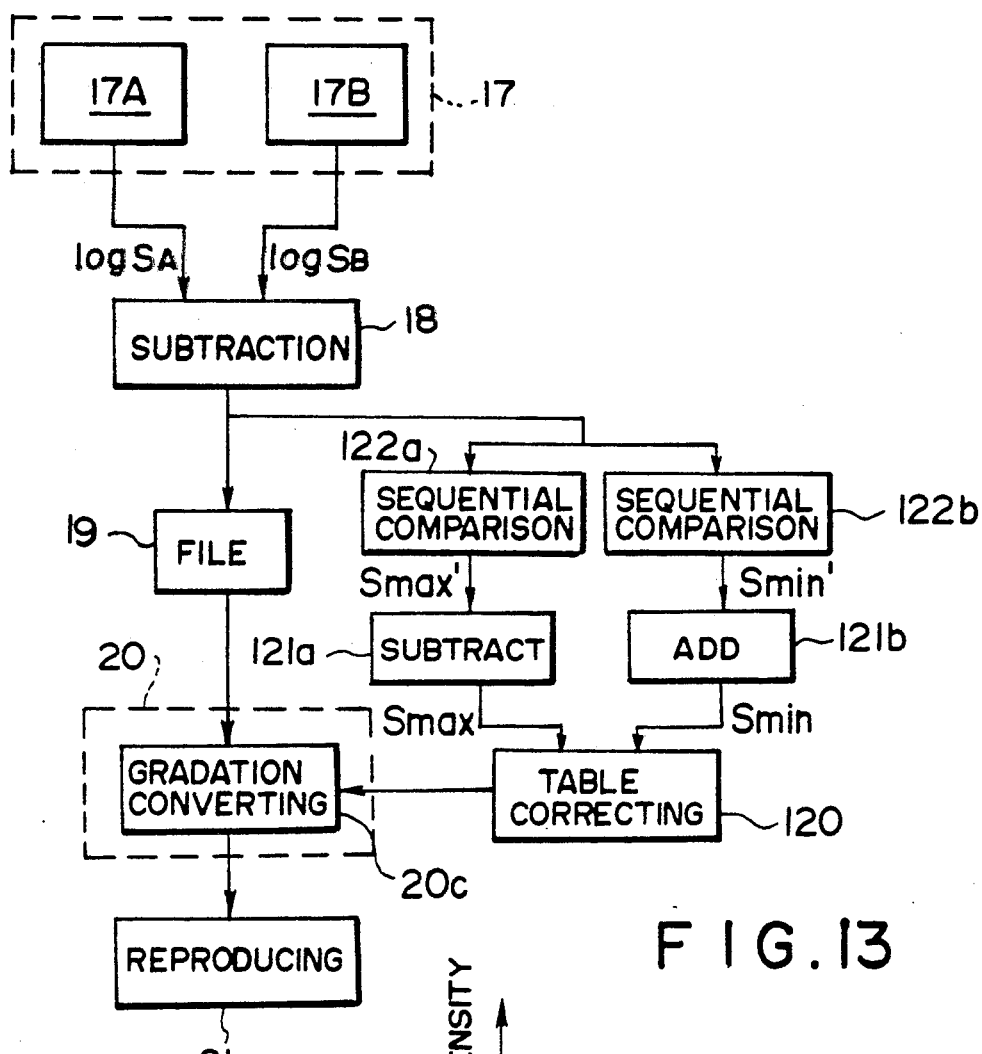
FIG. 12 is a block diagram showing an energy subtraction processing wherein a gradation processing is conducted by use of another embodiment of the method in accordance with the present invention.

FIG. 12 shows the flow of a subtraction processing in which a still further embodiment of the method in accordance with the present invention is employed. In this embodiment, instead of the histogram operation circuit 22 of FIG. 10, sequential comparison operation circuits 122a and 122b are used as the means for calculating the maximum value and the minimum value.

The sequential comparison operation circuit 122a stores the first value of the difference signal Ssub sent from the subtraction operation circuit 18 as the maximum value, and compares the stored value with the next sent value of the difference signal Ssub. The circuit 122a stores the larger value as the maximum value, and sequentially conducts the same processing on the subsequently sent values of the difference signal Ssub. By sequentially carrying out the processing up to the last value of the difference signal Ssub, the true maximum value Smax' over the whole range of the difference signal Ssub is obtained. The other sequential comparison operation circuit 122b compares the values of the difference signal Ssub in the same manner, and stores the smaller value as the minimum value of the difference signal Ssub, thereby calculating the true minimum value Smin' over the whole range of the difference signal Ssub. When the maximum value Smax' and the minimum value Smin' of the difference signal Ssub are calculated by the sequential comparison method, instead of temporarily storing the first sent value of the difference signal Ssub as the maximum value Smax' or the minimum value Smin', it is also possible to store in advance an arbitrary signal value sufficiently smaller than the estimated maximum value Smax' as the maximum value and to store in advance an arbitrary signal value sufficiently larger than the estimated minimum value Smin' as the minimum value.

The true maximum value Smax' and the true minimum value Smin' obtained as described above are respectively sent to a subtraction circuit 121a and an addition circuit 121b. In the subtraction circuit 121a, a predetermined signal level SΔa is subtracted from the true maximum value Smax', and the value (Smax'−SΔa) is generated as the maximum value Smax for optimizing the gradation processing. In the addition circuit 121b, a predetermined signal level SΔb is added to the true minimum value Smin', and the value (Smin'+SΔb) is generated as the minimum value Smin for optimizing the gradation processing. The gradation conversion table correcting circuit 120 receives the maximum value Smax and the minimum value Smin, and corrects the gradation conversion table 20c as indicated by the broken line in FIG. 13 so that the maximum value Smax and the minimum value Smin respectively correspond to the maximum density value Dmax and the minimum density value Dmin of the subtraction image. By correcting the gradation conversion table 20c in this manner, the density range and the contrast of the subtraction image are maintained the same.

Figure 13:
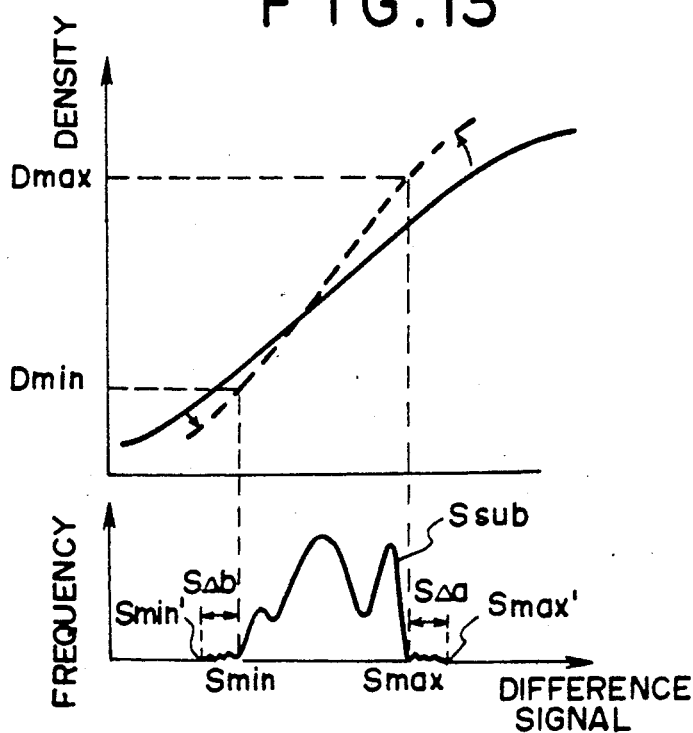
FIG. 13 is an explanatory view showing the gradation processing in the embodiment of FIG. 12.

As shown in FIG. 13, noise components caused by signal noise and scattered radiation at the image recording step are contained in the difference signal Ssub on the maximum and minimum level sides. The signal level SΔa subtracted from the true maximum value Smax' and the signal level SΔb added to the true minimum value Smin' are adjusted to values corresponding to the noise components. Therefore, by using the values (Smax'−SΔa) and (Smin'+SΔb) as the maximum value Smax and the minimum value Smin for optimizing the gradation processing, it is possible to eliminate adverse effects of the signal noise and scattered radiation and to utilize more efficiently the dynamic range of the recording medium for the subtraction image.

It is also possible to use a value at a point smaller by a signal number as counted from the point of the true maximum value Smax' and a value at a point larger by a signal number as counted from the point of the true minimum value Smin' respectively as the maximum value Smax and the minimum value Smin for optimizing the gradation processing.

The present invention is applicable also to the case where a subtraction image is obtained by recording radiation images on three stimulable phosphor sheets by use of radiations having different levels of energy, and conducting a subtraction processing of image signals detected from the stimulable phosphor sheets, for example, as expressed by a x logSA+b x logSB−c x logSC+d where a, b and c denote weight factors and d denotes a bias component for adjusting the density of the difference signal approximately to a predetermined value.

In order to obtain radiation images for the subtraction processing, i.e. radiation images wherein the image information on a specific structure is different, radiation energy to which the stimulable phosphor sheets are exposed may be changed by changing the tube voltage of the radiation source as in the aforesaid embodiments. Alternatively, a filter for changing the energy distribution of the radiation may be inserted between the radiation source and the object, or any other known method may be used. Also, the radiation images may be recorded by a single radiation exposure operation by use of a stimulable phosphor sheet-filter stack or the like as described in Japanese Patent Application No. 57(1982)-193765.

We claim:

1. A method of correcting the density of a subtraction image in a gradation processing in an energy subtraction processing which includes the steps of exposing two or more stimulable phosphor sheets to radiations having different levels of energy passing through the same object to have radiation images of said object stored in said stimulable phosphor sheets, at least a part of image information being different between said radiation images, scanning the respective stimulable phosphor sheets by stimulating rays to sequentially release the radiation energy stored in said stimulable phosphor sheets as light emission, photoelectrically detecting and converting the amounts of the emitted light into digital image signals, obtaining a difference signal for forming an image of a specific structure of said object by carrying out a subtraction processing of said digital image signals between corresponding picture elements of said radiation images, and then subjecting said difference signal to a gradation processing, the method of correcting the density of a subtraction image comprising the steps of: calculating a characteristic value in said difference signal, and making said characteristic value correspond to a predetermined density of a reproduced image.

2. A method as defined in claim 1 wherein said characteristic value of said difference signal is made to correspond to said predetermined density of said reproduced image by uniformly converting said difference signal prior to said gradation processing.

3. A method as defined in claim 1 wherein said characteristic value of said difference signal is made to correspond to said predetermined density of said reproduced image by correcting a gradation conversion table used for said gradation processing.

4. A method as defined in claim 1 wherein at least two different signal values are calculated as said characteristic value from a histogram of said difference signal, and are made to correspond to at least two predetermined density values of said reproduced image.

5. A method as defined in claim 4 wherein said at least two different signal values are the maximum signal value and the minimum signal value, and said maximum signal value and said minimum signal value are made to correspond respectively to the predetermined maximum density value and the predetermined minimum density value of said reproduced image.

6. A method as defined in claim 4 or 5 wherein said at least two different signal values of said difference signal are made to correspond to said at least two predetermined density values of said reproduced image by uniformly converting said difference signal prior to said gradation processing.

7. A method as defined in claim 4 or 5 wherein said at least two different signal values of said difference signal are made to correspond to said at least two predetermined density values of said reproduced image by correcting a gradation conversion table used for said gradation processing.

8. A method as defined in claim 1 wherein the maximum signal value and the minimum signal value of said difference signal are calculated as said characteristic value, and are made to correspond respectively to the predetermined maximum density value and the predetermined minimum density value of said reproduced image.

9. A method as defined in claim 8 wherein said maximum signal value is calculated by subtracting a predetermined signal level from the true maximum value in the whole range of said difference signal, and said minimum signal value is calculated by adding a predetermined signal level to the true minimum value in the whole range of said difference signal.

10. A method as defined in claim 8 wherein a value at a point smaller by a signal number as counted from the point of the true maximum value in the whole range of said difference signal is taken as said maximum signal value, and a value at a point larger by a signal number as counted from the true minimum value in the whole range of said difference signal is taken as said minimum signal value.

11. A method as defined in claim 8 wherein said maximum signal value and said minimum signal value are calculated by sequentially comparing the values of said difference signal.

12. A method as defined in claim 9 wherein said maximum signal value and said minimum signal value are calculated by sequentially comparing the values of said difference signal.

13. A method as defined in claim 10 wherein said maximum signal value and said minimum signal value are calculated by sequentially comparing the values of said difference signal.

14. A method as defined in any of claims 8 to 13 wherein said maximum signal value and said minimum signal value of said difference signal are made to correspond to said predetermined maximum density value and said predetermined minimum density value of said reproduced image by uniformly converting said difference signal prior to said gradation processing.

15. A method as defined in any of claims 8 to 13 wherein said maximum signal value and said minimum signal value of said difference signal are made to correspond to said predetermined maximum density value and said predetermined minimum density value of said reproduced image by correcting a gradation conversion table used for said gradation processing.

16. An apparatus for correcting the density of a subtraction image which comprises:
  (i) an image read-out means for scanning stimulable phosphor sheets carrying radiation images stored therein by stimulating rays which cause said stimulable phosphor sheets to emit light in proportion to the stored radiation energy, and photoelectrically detecting and converting the emitted light into digital image signals,
  (ii) a subtraction operation means for obtaining a difference signal for forming an image of a specific structure by conducting a subtraction processing of said digital image signals between the corresponding picture elements of said radiation images, said digital image signals being detected by said image read-out means from two or more stimulable phosphor sheets carrying said radiation images stored therein by exposure to radiations having different levels of energy passing through the same object, at least a part of the image information being different between said radiation images,
  (iii) an image processing means for conducting a gradation processing on said difference signal on the basis of a gradation conversion table,
  (iv) an operation means for calculating a predetermined characteristic value of said difference signal, and
  (v) a signal correcting circuit for making said characteristic value of said difference signal correspond to a predetermined density of a reproduced image by uniformly converting said difference signal prior to said gradation processing.

17. An apparatus as defined in claim 16 wherein said operation means for calculating said predetermined characteristic value is a histogram operation means for obtaining a histogram of said difference signal and calculating at least two different signal values of said histogram, and said signal correcting circuit is a signal conversion circuit for making said at least two different signal values correspond to at least two predetermined density values of said reproduced image by uniformly converting said difference signal prior to said gradation processing.

18. An apparatus as defined in claim 16 wherein said operation means for calculating said predetermined characteristic value is a maximum and minimum operation means for calculating the maximum signal value and the minimum signal value of said difference signal, and said signal correcting circuit is a signal conversion circuit for making said maximum signal value and said minimum signal value correspond to the predetermined maximum density value and the predetermined minimum density value of said reproduced image by uniformly converting said difference signal prior to said gradation processing.

19. An apparatus as defined in claim 18 wherein said maximum and minimum operation means is constructed so that a value obtained by subtracting a predetermined signal level from the true maximum value in the whole range of said difference signal is taken as said maximum signal value, and a value obtained by adding a predetermined signal level to the true minimum value in the whole range of said difference signal is taken as said minimum signal value.

20. An apparatus as defined in claim 18 wherein said maximum and minimum operation means is constructed so that a value at a point smaller by a signal number as counted from the point of the true maximum value in the whole range of said difference signal is taken as said maximum signal value, and a value at a point larger by a signal number as counted from the true minimum value in the whole range of said difference signal is taken as said minimum signal value.

21. An apparatus as defined in claim 18, 19 or 20 wherein said maximum and minimum operation means is a sequential comparison operation means for calculating said maximum signal value and said minimum signal value of said difference signal by sequentially comparing the values of said difference signal.

22. An apparatus for correcting the density of a subtraction image which comprises:
  (i) an image read-out means for scanning stimulable phosphor sheets carrying radiation images stored therein by stimulating rays which cause said stimulable phosphor sheets to emit light in proportion to the stored radiation energy, and photoelectrically detecting and converting the emitted light into digital image signals,
  (ii) a subtraction operation means for obtaining a difference signal for forming an image of a specific structure by conducting a subtraction processing of said digital image signals between the corresponding picture elements of said radiation images, said digital image signals being detected by said image read-out means from two or more stimulable phosphor sheets carrying said radiation images stored therein by exposure to radiations having different levels of energy passing through the same object, at least a part of image information being different between said radiation images, (iii) an image processing means for conducting a gradation processing on said difference signal on the basis of a gradation conversion table,
(iv) an operation means for calculating a predetermined characteristic value of said difference signal, and
(v) a gradation conversion table correcting circuit for making said characteristic value of said difference signal correspond to a predetermined density of a reproduced image by correcting said gradation conversion table.

23. An apparatus as defined in claim 22 wherein said operation means for calculating said predetermined characteristic value is a histogram operation means for obtaining a histogram of said difference signal and calculating at least two different signal values of said histogram, and said gradation conversion table correcting circuit makes said at least two different signal values correspond to at least two predetermined density values of said reproduced image by correcting said gradation conversion table.

24. An apparatus as defined in claim 22 wherein said operation means for calculating said predetermined characteristic value is a maximum and minimum operation means for calculating the maximum signal value and the minimum signal value of said difference signal, and said gradation conversion table correcting circuit makes said maximum signal value and said minimum signal value correspond to the predetermined maximum density value and the predetermined minimum density value of said reproduced image by correcting said gradation conversion table.

25. An apparatus as defined in claim 24 wherein said maximum and minimum operation means is constructed so that a value obtained by subtracting a predetermined signal level from the true maximum value in the whole range of said difference signal is taken as said maximum signal value, and a value obtained by adding a predetermined signal level to the true minimum value in the whole range of said difference signal is taken as said minimum signal value.

26. An apparatus as defined in claim 24 wherein said maximum and minimum operation means is constructed so that a value at a point smaller by a signal number as counted form the point of the true maximum value in the whole range of said difference signal is taken as said maximum signal value, and a value at a point larger by a signal number as counted from the true minimum value in the whole range of said difference signal is taken as said minimum signal value.

27. An apparatus as defined in claim 24, 25 or 26 wherein said maximum and minimum operation means is a sequential comparison operation means for calculating said maximum signal value and said minimum signal value of said difference signal by sequentially comparing the values of said difference signal.

* * * * *